US008778486B2

(12) United States Patent
Tanaka et al.

(10) Patent No.: US 8,778,486 B2
(45) Date of Patent: Jul. 15, 2014

(54) POLYCARBONATE RESIN AND TRANSPARENT FILM FORMED THEREFROM

(75) Inventors: Tomohiko Tanaka, Fukuoka (JP); Masashi Yokogi, Fukuoka (JP); Nao Murakami, Osaka (JP); Toshiyuki Iida, Osaka (JP)

(73) Assignees: Mitsubishi Chemical Corporation, Tokyo (JP); Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/474,224

(22) Filed: May 17, 2012

(65) Prior Publication Data

US 2012/0308796 A1 Dec. 6, 2012

Related U.S. Application Data

(63) Continuation of application No. PCT/JP2010/070390, filed on Nov. 16, 2010.

(30) Foreign Application Priority Data

Nov. 17, 2009 (JP) ................................. 2009-262011
May 27, 2010 (JP) ................................. 2010-121984
Jun. 30, 2010 (JP) ................................. 2010-149798

(51) Int. Cl.
B32B 27/28 (2006.01)
G02B 5/30 (2006.01)
C08G 64/04 (2006.01)

(52) U.S. Cl.
USPC ....... 428/220; 428/412; 359/483.01; 528/201

(58) Field of Classification Search
USPC .......... 428/212–220, 411.1–412; 359/483.01; 528/196–219
See application file for complete search history.

(56) References Cited

U.S. PATENT DOCUMENTS

| 5,245,456 A * | 9/1993 | Yoshimi et al. ............... 349/118 |
| 6,469,127 B1 * | 10/2002 | Furunaga et al. ............. 528/196 |
| 7,365,148 B2 | 4/2008 | Ono et al. |
| 2010/0104777 A1 | 4/2010 | Motoyoshi et al. |
| 2010/0190953 A1 | 7/2010 | Fuji et al. |
| 2010/0196720 A1 | 8/2010 | Kato et al. |
| 2011/0257362 A1 | 10/2011 | Fuji et al. |

FOREIGN PATENT DOCUMENTS

| EP | 2 502 954 A1 | 9/2012 |
| GB | 1079686 | 8/1967 |
| JP | 2004-067990 | 3/2004 |
| JP | 2005-031610 | 2/2005 |
| JP | 2006-028441 | 2/2006 |
| WO | WO 2004/111106 | 12/2004 |
| WO | WO 2006/041190 | 4/2006 |
| WO | WO 2008/020636 | 2/2008 |
| WO | WO 2008/156186 | 12/2008 |
| WO | WO 2009/075304 | 6/2009 |

OTHER PUBLICATIONS

Machine translation of JP 2004-067990. Retrieved May 9, 2013 JST.*
International Search Report issued Feb. 15, 2011 in PCT/JP2010/070390 filed Nov. 16, 2010.
Extended European Search Report issued Mar. 21, 2013, in European Patent Application No. 10831557.3.
Taiwanese Office Action issued Oct. 22, 2013, in Taiwan Patent Application No. 099139483 (with English translation).
U.S. Appl. No. 14/077,768, filed Nov. 12, 2013, Yokogi, et al.
An Extended European Search Report issued on Feb. 19, 2014, in corresponding application No. 13198926.1.
An Extended European Search Report issued on Apr. 1, 2014, in corresponding Application No. 13198923.8.
Chinese Office Action issued Feb. 27, 2014 in connection with corresponding Chinese Patent Application No. 201080051950.7, filed Nov. 16, 2010.

* cited by examiner

*Primary Examiner* — Prashant J Khatri
(74) *Attorney, Agent, or Firm* — Oblon, Spivak, McClelland, Maier & Neustadt, L.L.P.

(57) ABSTRACT

The polycarbonate resin of the invention includes a first structural unit derived from a dihydroxy compound represented by a general formula (1), a second structural unit derived from a dihydroxy compound represented by a general formula (2), and a third structural unit derived from at least one dihydroxy compound selected from the group consisting of a dihydroxy compound represented by a general formula (3), a dihydroxy compound represented by a general formula (4), a dihydroxy compound represented by a general formula (5), and a dihydroxy compound represented by a general formula (6), and in which the first structural unit derived from a dihydroxy compound represented by the general formula (1) accounts for 18% by mole or more of the polycarbonate resin. The above general formulae (1) to (6) are described in the specification of the present application.

10 Claims, No Drawings

POLYCARBONATE RESIN AND TRANSPARENT FILM FORMED THEREFROM

TECHNICAL FIELD

The present invention relates to a polycarbonate resin and a transparent film formed therefrom.

BACKGROUND ART

Polycarbonate resins are generally produced from starting materials induced from petroleum resources. In recent years, however, there is a fear about depletion of petroleum resources, and it is desired to supply a polycarbonate produced from a starting material obtained from biomass resources such as plants. Furthermore, in view of the fact that the global warming caused by increases in carbon dioxide emission and by accumulation thereof brings about climate changes, etc., there is a need for the development of a polycarbonate resin which is produced using a plant-derived monomer as a starting material and which, even when discarded after use, is carbon-neutral.

For example, a technique has been proposed in which isosorbide is used as a plant-derived monomer to obtain a polycarbonate resin through a transesterification reaction with diphenyl carbonate (see, for example, patent document 1).

Meanwhile, since polycarbonate resins produced from starting materials including isosorbide have high transparency, a low photoelastic coefficient, and heat resistance, it has been proposed to use the polycarbonate resins in optical applications such as the retardation plates and substrates of liquid-crystal display devices (see patent document 2). Also disclosed is a polycarbonate resin which has been produced from 9,9-bis(4-(2-hydroxyethoxy)phenyl)fluorene and isosorbide and which has a low photoelastic coefficient and excellent heat resistance and moldability and is suitable for use in optical applications (see patent document 3). Furthermore, a film formed from a polycarbonate resin which contains isosorbide and biscresolfluorene has also been disclosed, and it is disclosed that a retardation film formed from this polycarbonate resin not only has a low photoelastic coefficient but also shows reverse wavelength-dispersive characteristics, in which the phase retardation decreases as the wavelength decreases (see patent document 4).

PRIOR-ART DOCUMENTS

Patent Documents

Patent Document 1: British Patent No. 1,079,686, specification
Patent Document 2: JP-A-2006-28441
Patent Document 3: JP-A-2004-67990
Patent Document 4: International Publication No. 2006/41190

SUMMARY OF THE INVENTION

Problems that the Invention is to Solve

In the filed of transparent films including optical films such as retardation films for use in liquid-crystal display appliances, mobile appliances, etc., a material having higher orientation properties, i.e., a material which, even when formed into a thin film, attains a large retardation, has come to be desired in recent years as a result of the trend toward thickness reduction in appliances.

The patent documents and other documents include statements to the effect that the polycarbonate resins according to the prior-art techniques have high transparency and a low photoelastic coefficient. However, the films formed therefrom have insufficient toughness and the orientation properties and photoelastic coefficients thereof also have been unsatisfactory. In the case where those polycarbonate resins are to be used as a retardation film, a high stretch ratio cannot be used because of the lack of film toughness, resulting in poor orientation properties. Consequently, films formed therefrom cannot have a sufficiently reduced thickness and have been unsuitable for use in thin appliances.

An object of the invention is to eliminate the problems of the prior-art techniques and to provide a polycarbonate resin which has excellent film toughness, a low photoelastic coefficient, excellent orientation properties, and high birefringence and a transparent film formed from the polycarbonate resin.

Means for Solving the Problems

The present inventors made investigations in order to overcome those problems. As a result, the inventors have found that the problems can be eliminated with: a polycarbonate resin which contains a first structural unit derived from a dihydroxy compound represented by the following general formula (1), a second structural unit derived from a dihydroxy compound represented by the following general formula (2), and a third structural unit derived from at least one dihydroxy compound selected from the group consisting of a dihydroxy compound represented by the following general formula (3), a dihydroxy compound represented by the following general formula (4), a dihydroxy compound represented by the following general formula (5), and a dihydroxy compound represented by the following general formula (6), and in which the first structural unit derived from a dihydroxy compound represented by the general formula (1) accounts for 18% by mole or more of the polycarbonate resin; and a transparent film formed from the polycarbonate resin. A first aspect of the invention has been thus reached.

[Chem. 1]

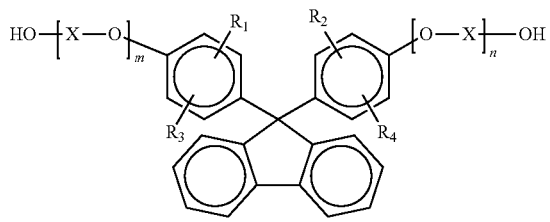

(1)

(In the general formula (1), $R_1$ to $R_4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms, and m and n each independently are an integer of 0-5.)

[Chem. 2]

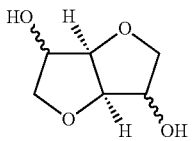

(2)

(In the general formula (3), $R_5$ represents a substituted or unsubstituted, monocyclic cycloalkylene group having 4-20 carbon atoms.)

[Chem. 4]

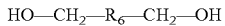

(4)

(In the general formula (4), $R_6$ represents a substituted or unsubstituted, monocyclic cycloalkylene group having 4-20 carbon atoms.)

[Chem. 5]

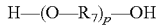

(5)

(In the general formula (5), $R_7$ represents a substituted or unsubstituted alkylene group having 2-10 carbon atoms, and p is an integer of 2 to 15.)

[Chem. 6]

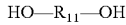

(6)

(In the general formula (6), $R_{11}$ represents either an alkyl group having 2-20 carbon atoms or the group represented by the following formula (7).)

[Chem. 7]

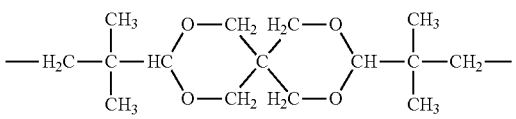

(7)

Namely, essential points of the first aspect of the invention reside in the following [1] to [16].

[1] A polycarbonate resin which contains a first structural unit derived from a dihydroxy compound represented by the general formula (1), a second structural unit derived from a dihydroxy compound represented by the general formula (2), and a third structural unit derived from at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6), wherein the first structural unit derived from a dihydroxy compound represented by the general formula (1) accounts for 18% by mole or more of the polycarbonate resin.

[2] The polycarbonate resin according to [1] above wherein the structural unit derived from at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6) account for 25% by mole or more of the polycarbonate resin.

[3] The polycarbonate resin according to [1] or [2] above which has a glass transition temperature of 110-150° C.

[4] The polycarbonate resin according to any one of [1] to [3] above which has a reduced viscosity of 0.30 dL/g or higher.

[5] The polycarbonate resin according to any one of [1] to [4] above which, in the state of having been stretched in a free-end stretch ratio of 2.0 under the conditions of (glass-transition temperature of the polycarbonate resin)+5° C., has a birefringence (Δn2) of 0.001 or higher.

[6] A transparent film formed from the polycarbonate resin according to any one of [1] to [5] above.

[7] The transparent film according to [6] above which has been formed through stretching conducted at least in one direction.

[8] The transparent film according to [6] or [7] above which has a refractive index as measured with sodium D-line (589 nm) of 1.57-1.62.

[9] The transparent film according to any one of [6] to [8] above which has a retardation R450 measured at a wavelength of 450 nm and a retardation R550 measured at a wavelength of 550 nm, the ratio of the R450 to the R550 satisfying the following expression [5].

$$0.5 \leq R450/R550 \leq 1.0 \qquad [5]$$

[10] The transparent film according to any one of [6] to [9] above which has a birefringence of 0.001 or higher.

[11] The transparent film according to any one of [6] to [10] above which has a thickness of 80 μm or less.

[12] The transparent film according to any one of [6] to [11] above which has refractive indexes, as measured respectively in two in-plane directions, of nx and ny and has a thickness-direction refractive index of nz, the refractive indexes nx, ny, and nz having a relationship which satisfies any of the following expressions [6] to [8].

$$nx > ny = nz \qquad [6]$$

$$nx > ny > nz \qquad [7]$$

$$nx > nz > ny \qquad [8]$$

[13] The transparent film according to any one of [6] to [12] above which has refractive indexes, as measured respectively in two in-plane directions, of nx and ny, a thickness-direction refractive index of nz, and a thickness of d, the refractive indexes nx, ny, and nz and the thickness d having a relationship which satisfies the following expressions [9] and [10].

$$NZ=(nx-nz)/(nx-ny)=0.2 \text{ to } 8 \qquad [9]$$

$$\Delta nd=(nx-ny)\cdot d=30 \text{ to } 400 \text{ nm} \qquad [10]$$

[14] The transparent film according to any one of [6] to [13] above which has a water absorption higher than 1.0% by weight.

[15] The transparent film according to any one of [6] to [14] above which has a photoelastic coefficient of $40 \times 10^{-12}$ $Pa^{-1}$ or less.

[16] A polarizing plate which comprises the transparent film according to any one of [6] to [15] above and a polarizer to which the transparent film has been laminated.

The present inventors further made investigations. As a result, the inventors have found out requirements for a transparent film capable of eliminating the problems described above, the material of the transparent film being not limited to the specific polycarbonate resin of the invention described above, although it is most preferred to use the polycarbonate resin. A second aspect of the invention has been thus reached.

Namely, essential points of the second aspect of the invention reside in the following [17] to [20].

[17] A transparent film formed from a polycarbonate resin, the transparent film having a birefringence of 0.001 or higher and a water absorption higher than 1.0% by weight and having a retardation R450 measured at a wavelength of 450 nm and a retardation R550 measured at a wavelength of 550 nm, the ratio of the R450 to the R550 satisfying the following expression [11].

$$0.75 \leq R450/R550 \leq 0.98 \qquad [11]$$

[18] The transparent film according to [17] above which has a thickness of 80 μm or less.
[19] The transparent film according to [17] or [18] above wherein the polycarbonate resin is a copolycarbonate resin.
[20] A polarizing plate which comprises the transparent film according to any one of [17] to [19] above and a polarizer to which the transparent film has been laminated.

Effects of the Invention

The polycarbonate resin of the invention and the transparent film formed therefrom have a low photoelastic coefficient and a moderate glass transition temperature. The polycarbonate resin has excellent film formation properties. The film formed therefrom has high toughness and hence high durability and has excellent orientation properties. The film hence is suitable for use as an optical film such as, for example, a retardation film.

MODES FOR CARRYING OUT THE INVENTION

The invention will be explained below in detail. The invention should not be construed as being limited to the following embodiments, and various modifications can be made therein without departing from the spirit of the invention.

[1] Polycarbonate Resin

The polycarbonate resin according to the invention is a polycarbonate resin which contains a first structural unit derived from a dihydroxy compound represented by the general formula (1), a second structural unit derived from a dihydroxy compound represented by the general formula (2), and a third structural unit derived from at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6), wherein the first structural unit derived from a dihydroxy compound represented by the general formula (1) accounts for 18% by mole or more of the polycarbonate resin.

<Dihydroxy Compound Represented by General Formula (1)>

Examples of the dihydroxy compound represented by the general formula (1) include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-propylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene. Preferred are 9,9-bis(4-hydroxy-3-methylphenyl)fluorene, 9,9-bis(4-(2-hydroxyethoxy)phenyl)fluorene, and 9,9-bis(4-(2-hydroxyethoxy)-3-methylphenyl)fluorene. Especially preferred is 9,9-bis(4-(2-hydroxyethoxy)phenyl)fluorene.

<Dihydroxy Compound Represented by General Formula (2)>

Examples of the dihydroxy compound represented by the general formula (2) include isosorbide, isomannide, and isoidide, which are stereoisomers. One of these may be used alone, or two or more thereof may be used in combination. Preferred of these dihydroxy compounds is isosorbide from the standpoints of ease of procurement and production thereof, optical properties, and moldability. Isosorbide is obtained by the dehydrating condensation of sorbitol, which is produced from various starches which are abundant resources and are easily available.

<Dihydroxy Compounds Represented by General Formula (3)>

Examples of the dihydroxy compounds represented by the general formula (3) include compounds containing a monocyclic cycloalkylene group. By using such a compound having a monocyclic structure, the polycarbonate resin to be obtained can be made to give films having improved toughness. Examples thereof usually include compounds containing a 5-membered cyclic structure or a 6-membered cyclic structure. By using such a compound having a 5-membered cyclic structure or 6-membered cyclic structure, the polycarbonate resin to be obtained can be made to have enhanced heat resistance. The 6-membered cyclic structure may have a chair form or boat form which has been fixed by means of covalent bonding. Specific examples thereof include 1,2-cyclopentanediol, 1,3-cyclopentanediol, 1,2-cyclohexanediol, 1,3-cyclohexanediol, 1,4-cyclohexanediol, and 2-methyl-1,4-cyclohexanediol.

<Dihydroxy Compounds Represented by General Formula (4)>

Examples of the dihydroxy compounds represented by the general formula (4) include compounds containing a monocyclic cycloalkylene group. By using such a compound having a monocyclic structure, the polycarbonate resin to be obtained can be made to give films having improved toughness. Usually, the compounds include various isomers represented by the general formula (4) in which $R_6$ is represented by the following general formula (Ia) (wherein $R^3$ represents a hydrogen atom or a substituted or unsubstituted alkyl group having 1-12 carbon atoms). Specific examples thereof include 1,2-cyclohexanedimethanol, 1,3-cyclohexanedimethanol, and 1,4-cyclohexanedimethanol.

[Chem. 8]

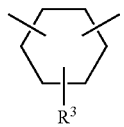

(Ia)

Especially preferred of the alicyclic dihydroxy compounds shown above are cyclohexanedimethanols. Preferred from the standpoints of availability and handleability are 1,4-cyclohexanedimethanol, 1,3-cyclohexanedimethanol, and 1,2-cyclohexanedimethanol.

Those compounds were shown as mere examples of the alicyclic dihydroxy compounds usable in the invention, and the alicyclic dihydroxy compounds should not be construed as being limited to those examples in any way. One of those alicyclic dihydroxy compounds may be used alone, or a mixture of two or more thereof may be used.

<Dihydroxy Compounds Represented by General Formula (5)>

Examples of the dihydroxy compounds represented by the general formula (5) include diethylene glycol, triethylene glycol, and polyethylene glycol (molecular weight, 150-2,000). Preferred of these is diethylene glycol.

<Dihydroxy Compounds Represented by General Formula (6)>

Examples of the dihydroxy compounds represented by the general formula (6) include ethylene glycol, propylene glycol, 1,4-butanediol, 1,6-hexanediol, or the spiro glycol represented by the following formula (8). Preferred of these are propylene glycol, 1,4-butanediol, and the spiro glycol.

[Chem. 9]

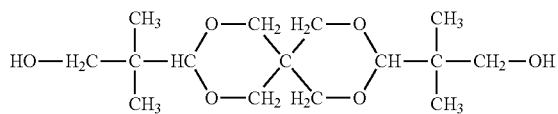

(8)

It is preferred that the polycarbonate resin of the invention should contain a third structural unit derived from a dihydroxy compound represented by the general formula (4) and/or a structural unit derived from a dihydroxy compound represented by the general formula (5), among a third structural unit derived from a dihydroxy compound represented by the general formula (3), a structural unit derived from a dihydroxy compound represented by the general formula (4), a structural unit derived from a dihydroxy compound represented by the general formula (5), and a structural unit derived from a dihydroxy compound represented by the general formula (6). It is more preferred that the polycarbonate resin should contain a third structural unit derived from a dihydroxy compound represented by the general formula (5).

The polycarbonate resin of the invention may further contain a structural unit derived from other dihydroxy compound.

<Other Dihydroxy Compounds>

Examples of the other dihydroxy compounds include bisphenol compounds.

Examples of the bisphenol compounds include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl) propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, and 4,4'-dihydroxy-2,5-diethoxydiphenyl ether.

In the polycarbonate resin of the invention, the first structural unit derived from a dihydroxy compound represented by the general formula (1) accounts for 18% by mole or more of the resin. The proportion of the first structural unit in the polycarbonate resin is preferably 20% by mole or more, more preferably 25% by mole or more. In the case where the proportion of the first structural unit is too small, there is a possibility that the polycarbonate resin might not show reverse wavelength-dispersive characteristics.

Furthermore, in the polycarbonate resin of the invention, the third structural unit derived from at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6) accounts for usually preferably 25% by mole or more, more preferably 30% by mole or more, even more preferably 35% by mole or more, of the polycarbonate resin. In the case where the proportion of the third structural unit is too small, there are the cases where this polycarbonate resin give films having poor toughness.

The polycarbonate resin of the invention has a glass transition temperature of preferably 110-150° C., more preferably 120-140° C. In the case where the glass transition temperature thereof is too low, this polycarbonate resin tends to have impaired heat resistance and there is a possibility that films formed therefrom might suffer a dimensional change. In addition, there are the cases where use of a retardation film formed therefrom and laminated to a polarizing plate results in a decrease in image quality. When the glass transition temperature of the polycarbonate resin is too high, there are the cases where this resin shows impaired molding stability during film formation therefrom and where the films have impaired transparency.

The molecular weight of the polycarbonate resin can be expressed in terms of reduced viscosity. The reduced viscosity thereof is determined in the following manner. A solution thereof having a polycarbonate concentration precisely adjusted to 0.6 g/dL is prepared using methylene chloride as a solvent, and the viscosity of the solution is measured at a temperature of 20.0±0.1° C. using an Ubbelohde viscometer. The lower limit of the reduced viscosity thereof is usually preferably 0.30 dL/g, more preferably 0.35 dL/g or higher. The upper limit of the reduced viscosity thereof is usually preferably 1.20 dL/g, more preferably 1.00 dL/g, even more preferably 0.80 dL/g.

When the reduced viscosity of the polycarbonate resin is lower than the lower limit, there are the cases where this polycarbonate resin poses a problem that molded articles obtained therefrom have reduced mechanical strength. On the other hand, in the case where the reduced viscosity thereof is higher than the upper limit, there are the cases where this polycarbonate resin shows reduced flowability when molded, thereby posing a problem that productivity and moldability decrease.

It is preferred that the transparent film obtained by molding the polycarbonate resin of the invention should have a birefringence of 0.001 or higher. Higher values of birefringence are preferred from the standpoint that the film to be formed from the polycarbonate resin is designed so as to have an exceedingly small thickness. Consequently, the birefringence thereof is more preferably 0.002 or higher. In the case where the birefringence thereof is less than 0.001, it is necessary to excessively increase the film thickness and hence to use the material in a larger amount, resulting in difficulties in controlling homogeneity with respect to thickness, transparency, and retardation. Because of this, when the transparent film produced from the polycarbonate resin has a birefringence less than 0.001, there is a possibility that this film cannot be applied to appliances which are required to be precise, thin, and homogeneous.

When properties of the polycarbonate resin of the invention are to be evaluated, it is preferred to evaluate the properties thereof in terms of the birefringence (Δn2) of a film obtained through stretching conducted in a free-end stretch ratio of 2.0 under the conditions of (glass-transition temperature of the polycarbonate resin)+5° C. By evaluating the birefringence (Δn2) of the film obtained under those conditions, the birefringence of the film in the state of having been highly oriented by stretching can be determined. There hence is a merit that the polycarbonate resin can be evaluated without impairing the orientation properties inherent in the material.

It is preferred that the transparent film obtained by molding the polycarbonate resin of the invention should have a refractive index, as measured with sodium D-line (589 nm), of 1.57-1.62. In the case where this refractive index thereof is lower than 1.57, there is a possibility that this film might have too low birefringence. On the other hand, in the case where the refractive index thereof exceeds 1.62, there is a possibility that this film might have an increased reflectance and reduced light transmission properties.

In the transparent film, the ratio of the retardation R450 measured at a wavelength of 450 nm to the retardation R550 measured at a wavelength of 550 nm (R450/R550) is preferably from 0.5 to 1.0, more preferably from 0.7 to 0.98, especially preferably from 0.75 to 0.95. So long as the ratio is within that range, ideal retardation characteristics can be obtained at each wavelength within the visible region. For example, when a retardation film having such a wavelength dependence is produced, for example, as a ¼λ plate and laminated to a polarizing plate, then a circularly polarizing plate or the like can be produced. Thus, a neutral polarizing plate and a neutral display device which have a small wavelength dependence of hue are rendered possible. On the other hand, in the case where that ratio is outside the range, the result is an increased wavelength dependence of hue, posing the problem of coloring in the polarizing plate or display device.

The thickness of the transparent film is preferably 80 μm or less, more preferably 60 μm or less, even more preferably 40 μm or less. In the case where the thickness thereof exceeds 80 μm, it is necessary to use the material in a larger amount, resulting in difficulties in controlling homogeneity. Such a transparent film hence cannot be applied to appliances which are required to be precise, thin, and homogeneous.

It is preferred that the transparent film should have refractive indexes, as measured respectively in two in-plane directions, of nx and ny and have a thickness-direction refractive index of nz, the refractive indexes nx, ny, and nz having a relationship which satisfies any of the following expressions [6] to [8].

$$nx>ny=nz \quad [6]$$

$$nx>ny>nz \quad [7]$$

$$nx>nz>ny \quad [8]$$

When the refractive indexes thereof have the relationship nx>ny=nz, then uniaxial retardation films such as a λ plate, λ/2 plate, and λ/4 plate are obtained. Such films can be used in the viewing-angle compensators of liquid-crystal displays or for the color correction of reflected light in reflection-type or semi-transmissive displays, organic EL devices, and the like.

When the refractive indexes thereof have the relationship nx>ny>nz, this transparent film can be used as the viewing-angle compensator of a liquid-crystal display, especially as the viewing-angle compensator working in the VA mode, which is of the type in which one sheet is used for compensation or the type in which two sheets are used for compensation. Furthermore, this transparent film can be used also as a film for the color correction of reflected light like the film described above.

When the refractive indexes thereof have the relationship nx>nz>ny, this transparent film can be used as the viewing-angle compensation film of a polarizing plate or as the viewing-angle compensation film of a circularly polarizing plate, and is usable also as a film for the color correction of reflected light like the film described above. Furthermore, besides being used for such front-view applications, this transparent film can be used also for viewing-angle compensation.

It is preferred that the two in-plane refractive indexes nx and ny, thickness-direction refractive index nz, and thickness d of the transparent film should have a relationship which satisfies the following expressions [9] and [10].

$$NZ\ coefficient=(nx-nz)/(nx-ny)=0.2\ to\ 8 \quad [9]$$

$$\Delta nd=(nx-ny)\cdot d=30\ to\ 400\ nm \quad [10]$$

By regulating the NZ coefficient so as to be within that range, this transparent film can be used to produce retardation films for viewing-angle compensation or color correction in various displays.

On the other hand, in the case where the NZ coefficient is less than 0.2, this necessitates an exceedingly special production process. This case hence may involve a drawback that the film has poor NZ coefficient accuracy and reduced productivity.

In the case where the NZ coefficient exceeds 8, this transparent film has an exceedingly large value of thickness-direction retardation, which is calculated using the equation Rth=(nx−nz)·d. Namely, it is necessary to increase the thickness of the material. This case hence may involve drawbacks such as an increase in material cost and a decrease in retardation reliability.

By regulating the Δnd so as to be within that range, this transparent film can be used to easily produce λ/2 plates and λ/4 plates therefrom.

On the other hand, in the case where the Δnd is less than 30 nm, this transparent film falls under C-plates, which are so-called negatively uniaxial retardation films. A C-plate by itself cannot be used for the viewing-angle compensation of a display and use of another retardation film is necessary, resulting in an increase in the total number of retardation films. This case hence may involve a drawback that a thickness reduction and a cost reduction are difficult.

In the case where the Δnd exceeds 400 nm, it is necessary to increase the thickness in order to obtain a large value of retardation, and the increased thickness may be a cause of a decrease in productivity or reliability.

It is preferred that the transparent film should have a water absorption higher than 1.0% by weight. When the water absorption thereof is higher than 1.0% by weight, adhesiveness can be easily ensured when this transparent film is laminated to another film, etc. For example, when the transparent film is to be laminated to a polarizing plate, it is easy to design an adhesive at will because this transparent film is hydrophilic and hence has a small contact angle with water. A high degree of adhesion design is hence possible. When the water absorption thereof is 1.0% by weight or less, there are the cases where this film is hydrophobic and has a large contact angle with water, making it difficult to design adhesiveness. In addition, there are the cases where this film is apt to be electrostatically charged and this may pose a problem that when this film is incorporated into a polarizing plate or display device, the product has an increased number of appearance defects due to inclusion of foreign matter, etc.

On the other hand, in the case where the water absorption thereof exceeds 2.0% by weight, the durability of optical properties in a high-humidity environment becomes poor. Such too high a water absorption hence is not so desirable.

Consequently, the water absorption of the transparent film according to the invention is preferably higher than 1.0% by weight but not higher than 2.0% by weight, and is more preferably 1.1-1.5% by weight.

It is preferred that the transparent film of the invention should have a photoelastic coefficient of $40 \times 10^{-12}$ $Pa^{-1}$ or less. In the case where the photoelastic coefficient thereof exceeds $40 \times 10^{-12}$ $Pa^{-1}$, the following problem may arise when this transparent film is laminated as a retardation film to a polarizing plate and this polarizing plate is mounted in a display device. Due to the stress which was caused during the laminating, partial stress is imposed on the retardation film by the action of the heat of the environment in which the display device is used or of the backlight. An uneven change in retardation hence occurs, resulting in a considerable decrease in image quality. Consequently, the photoelastic coefficient of the transparent film of the invention is preferably $40 \times 10^{-12}$ $Pa^{-1}$ or less, more preferably $35 \times 10^{-12}$ $Pa^{-1}$ or less.

By laminating the transparent film to a polarizer, a polarizing plate can be configured.

As the polarizer, any of known polarizers having various configurations can be employed. For example, use can be made of a polarizer produced by adsorbing a dichroic substance, e.g., iodine or a dichroic dye, onto any of various films to dye the film and then crosslinking, stretching, and drying the film, according to a conventionally-known method.

The other transparent film of the invention is formed from a polycarbonate resin which is not limited to the specific polycarbonate resin described above. This transparent film of the invention has a birefringence of 0.001 or higher and a water absorption higher than 1.0% by weight and has a retardation R450 measured at a wavelength of 450 nm and a retardation R550 measured at a wavelength of 550 nm, the ratio of the R450 to the R550 satisfying the following expression [11].

$$0.75 \leq R450/R550 \leq 0.98 \quad [11]$$

By regulating the birefringence thereof to 0.001 or higher and the water absorption thereof to above 1.0% by weight, the excellent effects described above are obtained. Furthermore, the limitation of the ratio (R450/R550) to a value of 0.75-0.98 makes it possible to sufficiently obtain the excellent effect that the retardation is enhanced as the wavelength decreases and ideal retardation characteristics are obtained at each wavelength within the visible-light region. For example, when a retardation film having such a wavelength dependence is produced as a ¼λ plate and laminated to a polarizing plate, a circularly polarizing plate or the like can be produced. Thus, a neutral polarizing plate and a neutral display device which have no wavelength dependence of hue are rendered highly possible.

It is preferred that the polycarbonate resin in this case should be a copolycarbonate resin. Thus, it is possible to obtain a film strength, reliability, and optical properties which are suitable for the intended use of the film.

This transparent film according to the invention has a transmittance of preferably 80% or higher, more preferably 90% or higher. So long as the transmittance thereof is within that range, the film obtained has been colored little and is transparent. When this transparent film is laminated to a polarizing plate, the resultant polarizing plate has a high degree of polarization and a high transmittance. When this polarizing plate is incorporated into a display device, high display quality is rendered possible.

<Process for Producing the Polycarbonate Resin>

The polycarbonate resin of the invention can be produced by a polymerization method in general use. The polymerization method may be either a solution polymerization method in which phosgene is used or a melt polymerization method in which dihydroxy compounds are reacted with a carbonic diester. However, a melt polymerization method is preferred in which a dihydroxy compound represented by the general formula (1), a dihydroxy compound represented by the general formula (2), and at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6) are reacted, optionally together with other dihydroxy compound, with a carbonic diester in the presence of a polymerization catalyst.

Examples of the carbonic diester to be used in this melt polymerization method usually include carbonic diesters represented by the following general formula (9).

[Chem. 10]

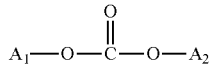

(9)

(In the general formula (9), $A_1$ and $A_2$ each independently are a substituted or unsubstituted aliphatic group having 1-18 carbon atoms or a substituted or unsubstituted aromatic group having 6-18 carbon atoms.)

Examples of the carbonic diesters represented by the general formula (9) include diphenyl carbonate, substituted diphenyl carbonates represented by ditolyl carbonate, dimethyl carbonate, diethyl carbonate, and di-t-butyl carbonate. Especially preferred examples thereof include diphenyl carbonate and substituted diphenyl carbonates. One of these carbonic diesters may be used alone, or a mixture of two or more thereof may be used.

The carbonic diester is used in such an amount that the molar ratio thereof to all dihydroxy compounds to be subjected to the reaction, which include oxyalkylene glycols, is preferably 0.90-1.10, more preferably 0.96-1.04. When the molar ratio thereof is less than 0.90, there are the cases where the polycarbonate resin produced has an increased amount of terminal hydroxyl groups and the polymer has impaired thermal stability or where a desired high-molecular polymer is not obtained. In the case where the molar ratio thereof exceeds 1.10, the rate of the transesterification reaction decreases when the reaction is conducted under the same conditions, or it becomes difficult to produce a polycarbonate resin having a desired molecular weight. In addition, the polycarbonate resin thus produced has an increased residual carbonic diester content, and there are the cases where this residual carbonic diester is a cause of odor during molding or in the molded articles.

As the polymerization catalyst (i.e., transesterification catalyst) for the melt polymerization, use may be made of an alkali metal compound and/or an alkaline earth metal compound. Although it is possible to use a basic compound such as a basic boron compound, basic phosphorus compound, basic ammonium compound, or amine compound as an auxiliary together with an alkali metal compound and/or an alkaline earth metal compound, it is especially preferred to use an alkali metal compound and/or an alkaline earth metal compound only.

Examples of the alkali metal compound to be used as a polymerization catalyst include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A.

Examples of the alkaline earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. In this description, the terms "alkali metal" and "alkaline earth metal" are used as terms having the same meanings as "Group-1 element" and "Group-2 element", respectively, within the long-form periodic table (Nomenclature of Inorganic Chemistry IUPAC Recommendations 2005).

One of these alkali metal compounds and/or alkaline earth metal compounds may be used alone, or two or more thereof may be used in combination.

Examples of the basic boron compound which may be used in combination with the alkali metal compound and/or alkaline earth metal compound include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and amino quinoline.

One of these basic compounds also may be used alone, or two or more thereof may be used in combination.

In the case where an alkali metal compound and/or an alkaline earth metal compound is employed, the amount of the polymerization catalyst to be used, in terms of metal amount per mole of all dihydroxy compounds to be subjected to the reaction, is generally in the range of 0.1-100 μmol, preferably in the range of 0.5-50 μmol, more preferably in the range of 1-25 μmol. In the case where the polymerization catalyst is used in too small an amount, polymerization activity required for producing a polycarbonate resin having a desired molecular weight is not obtained. On the other hand, in the case where the polymerization catalyst is used in too large an amount, a polycarbonate resin having an impaired hue is obtained, and by-products are generated, resulting in reduced flowability and an increased amount of gel particles. There are hence the cases where it is difficult to produce a polycarbonate resin of desired quality.

In such production of a polycarbonate resin of the invention, the dihydroxy compound represented by the general formula (1) may be fed as a solid, or may be heated and fed in a molten state, or may be fed as an aqueous solution.

Furthermore, each of the dihydroxy compound represented by the general formula (2) and the at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6) also may be fed as a solid, or may be heated and fed in a molten state, or may be fed as an aqueous solution when soluble in water. The same applies to the other dihydroxy compound.

The method in which a dihydroxy compound represented by the general formula (1), a dihydroxy compound represented by the general formula (2), and at least one dihydroxy compound selected from the group consisting of a dihydroxy compound represented by the general formula (3), a dihydroxy compound represented by the general formula (4), a dihydroxy compound represented by the general formula (5), and a dihydroxy compound represented by the general formula (6) are reacted, optionally together with other dihydroxy compound, with a carbonic diester in the presence of a polymerization catalyst in the invention is usually conducted in multiple steps including two or more stages. Specifically, the reaction in the first stage is conducted at a temperature of 140-220° C., preferably 150-200° C., for 0.1-10 hours, preferably 0.5-3 hours. In the second and any succeeding stages, the reaction temperature is raised while gradually lowering the pressure of the reaction system from the pressure used in the first stage. The polycondensation reaction is thus conducted while the monohydroxy compound, e.g., phenol, which generates simultaneously is being removed from the reaction system. Finally, the polycondensation reaction is conducted at a pressure of the reaction system of 200 Pa or below and at a temperature in the range of 210-280° C.

With respect to pressure reduction in this polycondensation reaction, it is important to control a balance between the temperature and the internal pressure of the reaction system. Especially when either the temperature or the pressure is changed too early, there are the cases where an unreacted monomer is distilled off from the reaction system to change the molar ratio of the dihydroxy compounds to the carbonic diester, resulting in a decrease in polymerization degree. For example, when a dihydroxy compound represented by the general formula (1), isosorbide as a dihydroxy compound represented by the general formula (2), and 1,4-cyclohexanedimethanol as an alicyclic dihydroxy compound are used and when the molar proportion of the 1,4-cyclohexanedimethanol to all dihydroxy compounds is 50% by mole or more, then some of the 1,4-cyclohexanedimethanol is apt to be distilled off in the monomer state from the reaction system. In this case, use may be made of a method in which the reaction mixture is reacted at a reduced internal pressure of the reaction system of about 13 kPa while elevating the temperature at a heating rate of 40° C./hr or less and further reacted at a pressure down to about 6.67 kPa while elevating the temperature at a heating rate of 40° C./hr or less, and the polycondensation reaction is finally conducted at a pressure of 200 Pa or less and a temperature of 200-250° C. This method is preferred because a polycarbonate resin having a sufficiently increased degree of polymerization is obtained.

On the other hand, when the molar proportion of the 1,4-cyclohexanedimethanol to all dihydroxy compounds including oxyalkylene glycols is less than 50% by mole, in particular, 30% by mole or less, an abrupt increase in viscosity occurs as compared with the case in which the proportion of the 1,4-cyclohexanedimethanol is 50% by mole or more. Consequently, use may be made, for example, of a method in which the reaction mixture is reacted, while elevating the temperature at a heating rate of 40° C./hr or less until the internal pressure of the reaction system is reduced to about 13 kPa, and further reacted at a pressure down to about 6.67 kPa while elevating the temperature at a heating rate of 40° C./hr or higher, preferably at a heating rate of 50° C./hr or higher, and the polycondensation reaction is finally conducted at a reduced pressure of 200 Pa or less and a temperature of 220-290° C. This method is preferred because a polycarbonate resin having a sufficiently increased degree of polymerization is obtained.

The mode of reaction operation may be any of the batch type, the continuous type, and a combination of the batch type and the continuous type.

When the polycarbonate resin of the invention is produced by the melt polymerization method, it is possible to add phosphoric acid compounds, phosphorous acid compounds, or metal salts of either during the polymerization for the purpose of preventing coloring.

Suitable as the phosphoric acid compounds are one or more of trialkyl phosphates such as trimethyl phosphate and triethyl phosphate. The amount of such phosphoric acid compounds to be added is preferably 0.0001-0.005% by mole, more preferably 0.0003-0.003% by mole, based on all dihydroxy compounds to be reacted. When phosphorus compounds are added in an amount smaller than the lower limit, there are the cases where the effect of preventing coloring is low. When the amount thereof is larger than the upper limit, there are the cases where the phosphorus compounds are causative of an increase in haze or enhance, rather than diminish, coloring, or where the phosphorus compounds reduce the heat resistance.

In the case of adding phosphorous acid compounds, any of the following heat stabilizers can be selected at will. In particular, use of one or more of trimethyl phosphite, triethyl phosphite, trisnonylphenyl phosphite, trimethyl phosphate, tris(2,4-di-tert-butylphenyl)phosphite, and bis(2,4-di-tert-butylphenyl)pentaerythritol diphosphite is suitable. The amount of these phosphorous acid compounds to be added is preferably 0.0001-0.005% by mole, more preferably 0.0003-0.003% by mole, based on all dihydroxy compounds to be reacted. When phosphorous acid compounds are added in an amount smaller than the lower limit, there are the cases where the effect of preventing coloring is low. When the amount thereof is larger than the upper limit, there are the cases where the phosphorous acid compounds are causative of an increase in haze or enhance, rather than diminish, coloring, or where the phosphorous acid compounds reduce the heat resistance.

It is possible to add a phosphoric acid compound and a phosphorous acid compound in combination or to add metal salts thereof in combination. In this case, the total addition amount of the phosphoric acid compound and the phosphorous acid compound or the total addition amount of the metal salts thereof is preferably 0.0001-0.005% by mole, more preferably 0.0003-0.003% by mole, based on all the dihydroxy compounds shown above. When the addition amount thereof is smaller than the lower limit, there are the cases where the effect of preventing coloring is low. When the addition amount thereof is larger than the upper limit, there are the cases where the compounds or salts are causative of an increase in haze or enhance, rather than diminish, coloring, or where the compounds or salts reduce the heat resistance.

The metal salts of phosphoric acid compounds and of phosphorous acid compounds preferably are alkali metal salts thereof and the zinc salts thereof. Especially preferred are the zinc salts. Preferred of the phosphoric acid zinc salts are the zinc salts of (long-chain-alkyl)phosphoric acids.

A heat stabilizer can be incorporated into the polycarbonate resin of the invention thus produced, in order to prevent the resin from decreasing in molecular weight or deteriorating in hue during molding, etc.

Examples of the heat stabilizer include phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are tris(nonylphenyl)phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination.

Such a heat stabilizer can be additionally incorporated in addition to the amount of the heat stabilizer which was added during the melt polymerization. Namely, after a polycarbonate resin has been obtained using an adequate amount of a phosphorous acid compound or phosphoric acid compound incorporated into the system, a phosphorous acid compound may be further incorporated by the incorporation method which will be described later. Thus, the heat stabilizer can be incorporated in a larger amount while avoiding an increase in haze, coloring, and a decrease in heat resistance during the polymerization, making it possible to prevent hue deterioration.

The amount of those heat stabilizers to be incorporated per 100 parts by weight of the polycarbonate resin is preferably 0.0001-1 part by weight, more preferably 0.0005-0.5 parts by weight, even more preferably 0.001-0.2 parts by weight.

A generally known antioxidant can be incorporated into the polycarbonate resin of the invention for the purpose of preventing oxidation.

Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis [3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl)isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane, and the like.

The amount of these antioxidants to be incorporated is preferably 0.0001-0.5 parts by weight per 100 parts by weight of the polycarbonate.

<Processes for Producing Transparent Film>

For producing a transparent film from a polycarbonate resin in the invention, various film formation techniques such as, for example, melt extrusion (e.g., T-die molding), cast coating (e.g., casting), calendering, hot pressing, coextrusion, co-melting, multilayer extrusion, and inflation molding can be used without particular limitations. Preferred examples include T-die molding, inflation molding, and casting.

The transparent films of the invention can be used as retardation plates, when the films have been stretched at least in one direction. For the stretching, use may be made of various stretching techniques such as free-end stretching, fixed-end stretching, free-end shrinkage, and fixed-end shrinkage. One of such techniques can be used alone, or such techniques may be used simultaneously or successively.

With respect to stretching directions also, the films can be stretched in various directions or various dimensions without particular limitations. For example, the films can be stretched in a horizontal direction, a vertical direction, a thickness direction, or a diagonal direction.

With respect to the temperature at which each film is to be stretched, a stretching temperature within the range of (glass transition temperature (Tg) of the polycarbonate resin)±20° C. can be suitably set according to the method of stretching, thickness of the film, and desired retardation.

EXAMPLES

The invention will be explained below in more detail by reference to Examples, but the invention should not be construed as being limited by the following Examples unless the invention departs from the spirit thereof. In the following Examples, properties of polycarbonate resins and transparent films were evaluated by the following methods. Incidentally, methods for property evaluation are not limited to the following methods, and suitable methods can be selected by a person skilled in the art.

(1) Photoelastic Coefficient

<Sample Production>

A 4.0-g portion of a polycarbonate resin sample which had been vacuum-dried at 80° C. for 5 hours was pressed for 1 minute with a hot press using a spacer having a width of 8 cm, length of 8 cm, and thickness of 0.5 mm, under the conditions of a hot-pressing temperature of 200-250° C., a preheating period of 1-3 minutes, and a pressure of 20 MPa. Thereafter, the sample was taken out together with the spacer and then pressed and cooled with a water tube cooling type press at a pressure of 20 MPa for 3 minutes to produce a sheet. A sample having a width of 5 mm and a length of 20 mm was cut out of the sheet.

<Measurement>

A measurement was made using an apparatus including a combination of a birefringence analyzer constituted of a He—Ne laser, a polarizer, a compensator, an analyzer, and a photodetector and an oscillatory type viscoelastometer ("DVE-3", manufactured by Rheology Co., Ltd.). (For details, refer to *Journal of the Society of Rheology Japan*, Vol. 19, pp. 93-97 (1991).)

The sample cut out was fixed to the viscoelastometer and examined for storage modulus E' at a frequency of 96 Hz at room temperature of 25° C. Simultaneously therewith, the laser light emitted was passed through the polarizer, the sample, the compensator, and the analyzer in this order, picked up with the photodetector (photodiode), and passed through a lock-in amplifier, and the waveform at an angular frequency of ω or 2ω was examined for retardation with respect to the amplitude and strain. A strain-optical coefficient O' was determined therefrom. In this apparatus, the polarizer and the analyzer were regulated so that the directions thereof were perpendicular to each other and each formed an angle of π/4 with the direction of extension of the sample.

The photoelastic coefficient C was determined from the storage modulus E' and the strain-optical coefficient O' using the following equation.

$$C = O'/E'$$

(2) Wavelength-Dispersive Characteristics of Birefringence

A polycarbonate resin which had been vacuum-dried at 80° C. for 5 hours was formed into a film having a thickness of 100 µm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. A sample having a width of 6 cm and a length of 6 cm was cut out of the film. This sample was subjected to uniaxial stretching using a batch-type biaxially stretching apparatus (manufactured by Toyo Seiki Seisaku-Sho, Ltd.) at a stretching temperature of (glass transition temperature of the polycarbonate resin)+15° C. and a stretching speed of 720 mm/min (strain rate, 1,200%/min) in a stretch ratio of 1×2.0 to obtain a transparent film. In this operation, the sample was stretched while being held (stretch ratio, 1.0) along the direction perpendicular to the stretch direction.

Using a retardation analyzer ("KOBRA-WPR", manufactured by Oji Scientific Instruments), a sample having a width of 4 cm and a length of 4 cm cut out of the transparent film was examined for phase retardation at a measuring wavelength of 450 nm (R450) and phase retardation at a measuring wavelength of 550 nm (R550). The ratio between the measured values of retardation (R450) and retardation (R550) was calculated.

(3) Birefringence (Δn1) of Transparent Film

A sample cut out of the transparent film obtained in (2) above was examined for retardation at a wavelength of 590 nm (R590) using the retardation analyzer. This retardation (R590) was divided by the thickness (t) of the sample to determine the birefringence using the following equation.

$$\text{Birefringence}(\Delta n1) = R590/t$$

(4) Film Toughness

A sample having a width of 2 cm and a length of 7 cm cut out of the transparent film obtained in (2) above was folded into two at the center thereof and then folded in the reverse direction. This folding was repeated, and the number of folding operations required for the sample to break was counted.

(5) Glass Transition Temperature Tg

Using a differential scanning calorimeter ("DSC 220", manufactured by SII Nano Technology Inc.), about 10 mg of a polycarbonate resin was examined while heating the resin at a heating rate of 10° C./min. In accordance with JIS-K7121 (1987), the lower-temperature-side base line was extended toward the higher-temperature side to draw a straight line, and a tangent that touched the stepwise changing part, which was due to a glass transition, at the point where the curve had a maximum slope was drawn. The extrapolated glass transition initiation temperature, which was the temperature corresponding to the intersection of the straight line and the tangent, was determined and taken as the glass transition temperature.

(6) Reduced Viscosity

The reduced viscosity of a polycarbonate resin was determined using an Ubbelohde viscometer manufactured by Moritomo Rika Kogyo. Methylene chloride was used as a solvent, and a measurement was made at a temperature of 20.0±0.1° C. The concentration was precisely adjusted to 0.6 g/dL.

From the flow-down time of the solvent t0 and the flow-down time of the solution t, the relative viscosity $\eta rel$ was determined using the following equation.

$$\eta rel = t/t0$$

The specific viscosity $\eta sp$ was determined from the relative viscosity $\eta rel$ using the following equation.

$$\eta sp = (\eta - \eta 0)/\eta 0 = \eta rel - 1$$

The specific viscosity $\eta sp$ was divided by the concentration c (g/dL) to determine the reduced viscosity (converted viscosity) $\eta red$, as shown by the following equation.

$$\eta red = \eta sp/c$$

The larger the value thereof, the higher the molecular weight.

(7) Water Absorption

Water absorption was determined by examining a stretched film having a thickness of 130±50 μm in accordance with the "Test Method for Determining Water Absorption and Boiling-water Absorption of Plastics" as provided for in JIS K 7209.

Example 1

Into a reaction vessel were introduced 26.2 parts by weight of isosorbide (hereinafter often abbreviated to "ISB"), 100.5 parts by weight of 9,9-bis(4-(2-hydroxyethoxy)phenyl)fluorene (hereinafter often abbreviated to "BHEPF"), 10.7 parts by weight of 1,4-cyclohexanedimethanol (hereinafter often abbreviated to "1,4-CHDM"), 105.1 parts by weight of diphenyl carbonate (hereinafter often abbreviated to "DPC"), and 0.591 parts by weight of cesium carbonate (0.2% by weight aqueous solution) as a catalyst. In a nitrogen atmosphere, the temperature of the heat medium of the reaction vessel was regulated to 150° C. to dissolve the starting materials while stirring the mixture according to need (about 15 minutes) in preparation for a first reaction step.

Subsequently, the internal pressure of the reaction vessel was reduced from ordinary pressure to 13.3 kPa, and the temperature of the heat medium of the reaction vessel was elevated to 190° C. over 1 hour, during which the phenol that generated was discharged from the reaction vessel.

The internal temperature of the reaction vessel was kept at 190° C. for 15 minutes. Thereafter, a second step was conducted in which at an internal pressure of the reaction vessel of 6.67 kPa, the temperature of the heat medium of the reaction vessel was elevated to 230° C. over 15 minutes and the phenol that generated was discharged from the reaction vessel. The stirring torque of the stirrer increased gradually and, hence, the temperature was elevated to 250° C. over 8 minutes. Furthermore, the internal pressure of the reaction vessel was reduced to 0.200 kPa or below in order to remove the phenol that generated. After a given stirring torque had been reached, the reaction was terminated. The reaction product yielded was extruded in water and then pelletized. Thus, a polycarbonate resin A configured of BHEPF/ISB/1,4-CHDM=47.4 mol %/37.1 mol %/15.5 mol % was obtained. The polycarbonate resin A obtained was examined for properties including reduced viscosity, and the measured values are shown in Table 1.

The polycarbonate resin A obtained was vacuum-dried at 80° C. for 5 hours and then formed into a film having a thickness of 100 μm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. A sample having a width of 6 cm and a length of 6 cm was cut out of the film. This sample was subjected to uniaxial stretching using a batch-type biaxially stretching apparatus (manufactured by Toyo Seiki Seisaku-Sho, Ltd.) at a stretching temperature of (glass transition temperature)+15° C. and a stretching speed of 720 mm/min (strain rate, 1,200%/min) in a stretch ratio of 1×2.0 to obtain a transparent film. In this operation, the sample was stretched while being held (stretch ratio, 1.0) along the direction perpendicular to the stretch direction.

The stretched transparent film obtained was examined for properties including birefringence, and the measured values are shown in Table 1.

Example 2

The same procedure as in Example 1 was conducted, except that use was made of 35.1 parts by weight of ISB, 90.2 parts by weight of BHEPF, 10.6 parts by weight of diethylene glycol (hereinafter often abbreviated to "DEG"), 118.6 parts by weight of DPC, and 0.666 parts by weight of the aqueous cesium carbonate solution as a catalyst. Thus, a polycarbonate resin B was obtained. The polycarbonate resin B obtained had a composition composed of BHEPF/ISB/DEG=37.7 mol %/44.0 mol %/18.3 mol %. The properties of the polycarbonate resin B were determined. A transparent film was formed therefrom in the same manner as in Example 1, and the properties thereof were determined. The results thereof are shown in Table 1.

Example 3

The same procedure as in Example 1 was conducted, except that use was made of 27.8 parts by weight of ISB, 82.1 parts by weight of BHEPF, 25.6 parts by weight of 1,4-CHDM, 120.8 parts by weight of DPC, and 0.679 parts by weight of the aqueous cesium carbonate solution as a catalyst. Thus, a polycarbonate resin C was obtained. The polycarbonate resin C obtained had a composition composed of BHEPF/ISB/1,4-CHDM=33.7 mol %/34.3 mol %/32.0 mol %. The properties of the polycarbonate resin C were determined. A transparent film was formed therefrom in the same manner as in Example 1, and the properties thereof were determined. The results thereof are shown in Table 1.

Example 4

The same procedure as in Example 1 was conducted, except that use was made of 37.5 parts by weight of ISB, 91.5 parts by weight of BHEPF, 8.4 parts by weight of polyethylene glycol having an average molecular weight of 400 (hereinafter often abbreviated to "PEG#400"), 105.7 parts by weight of DPC, and 0.594 parts by weight of the aqueous cesium carbonate solution as a catalyst. Thus, a polycarbonate resin D was obtained. The polycarbonate resin D obtained had a composition composed of BHEPF/ISB/PEG#400=42.9 mol %/52.8 mol %/4.3 mol %. The properties of the polycarbonate resin D were determined. A transparent film was formed therefrom in the same manner as in Example 1, and the properties thereof were determined. The results thereof are shown in Table 1.

Example 5

The same procedure as in Example 1 was conducted, except that use was made of 44.8 parts by weight of ISB, 85.6 parts by weight of BHEPF, 6.2 parts by weight of PEG#400, 112.3 parts by weight of DPC, and 0.631 parts by weight of the aqueous cesium carbonate solution as a catalyst. Thus, a polycarbonate resin E was obtained. The polycarbonate resin E obtained had a composition composed of BHEPF/ISB/PEG#400=37.8 mol %/59.3 mol %/2.9 mol %. The properties of the polycarbonate resin E were determined. A transparent film was formed therefrom in the same manner as in Example 1, and the properties thereof were determined. The results thereof are shown in Table 1.

Example 6

The same procedure as in Example 1 was conducted, except that use was made of 41.8 parts by weight of ISB, 88.1 parts by weight of BHEPF, 5.9 parts by weight of DEG, 118.1 parts by weight of DPC, and 0.664 parts by weight of the aqueous cesium carbonate solution as a catalyst. Thus, a polycarbonate resin F was obtained. The polycarbonate resin F obtained had a composition composed of BHEPF/ISB/DEG=37.0 mol %/52.7 mol %/10.3 mol %. The properties of the polycarbonate resin F were determined. A transparent film was formed therefrom in the same manner as in Example 1, and the properties thereof were determined. The results thereof are shown in Table 1.

Comparative Example 1

Into a reaction vessel were introduced 13.16 parts by weight of ISB, 22.72 parts by weight of 9,9-bis(4-hydroxy-3-methylphenyl)fluorene (hereinafter often abbreviated to "BCF"), 29.44 parts by weight of tricyclodecanedimethanol (hereinafter often abbreviated to "TCDDM"), 64.9 parts by weight of DPC, and $2.74 \times 10^{-3}$ parts by weight of tetramethylammonium hydroxide and $40.84 \times 10^{-6}$ parts by weight of the disodium salt of 2,2-bis(4-hydroxyphenyl)propane as catalysts. In a nitrogen atmosphere, the temperature of the heat medium of the reaction vessel was regulated to 180° C. to dissolve the starting materials.

Subsequently, the internal pressure of the reaction vessel was reduced from ordinary pressure to 13.3 kPa, and the phenol that generated was discharged from the reaction vessel.

The internal temperature of the reaction vessel was then elevated to 200° C. Thereafter, the pressure was gradually reduced, and the mixture was reacted at 3.99 kPa for 20 minutes and further reacted at an elevated reaction-vessel internal temperature of 215° C. for 20 minutes, while the phenol that generated was being discharged from the reaction vessel. Subsequently, the mixture was reacted at an elevated reaction-vessel internal temperature of 230° C. for 10 minutes, continuously reacted at a reduced pressure of 2.66 kPa for 10 minutes, and further reacted at an elevated temperature of 250° C. for 10 minutes. Thereafter, the mixture was reacted at a reduced pressure of 1.33 kPa for 10 minutes, and the pressure was further reduced finally to 0.133 kPa or below, at which the mixture was reacted for 1.5 hours to complete the reaction. The reaction product yielded was extruded in water and then pelletized. Thus, a polycarbonate resin G configured of ISB/TCDDM/BCF=30.0 mol %/50.0 mol %/20.0 mol % was obtained. The properties of the polycarbonate resin G obtained were determined. A transparent film was formed therefrom in the same manner as in Example 1, and the properties thereof were determined. The measured values are shown in Table 1.

Comparative Example 2

Into a reaction vessel were introduced 34.3 parts by weight of ISB, 103.3 parts by weight of BHEPF, 102.5 parts by weight of DPC, and $5.0 \times 10^{-3}$ parts by weight of sodium hydrogen carbonate as a catalyst. In a nitrogen atmosphere, the temperature of the heat medium of the reaction vessel was regulated to 180° C. to dissolve the starting materials.

Subsequently, the pressure of the reaction vessel was reduced from ordinary pressure to 20 kPa, and the temperature was elevated to 200° C. at a heating rate of 60° C./hr. This state was maintained for 20 minutes to react the mixture. The temperature was further elevated to 225° C. at a heating rate of 75° C./hr. At 10 minutes after completion of the heating, the degree of vacuum began to be reduced while holding the mixture at that temperature. The degree of vacuum was thus reduced to 1 mmHg or below over 1 hour. Thereafter, the temperature was elevated to 235° C. at a heating rate of 60° C./hr, and the mixture was reacted for further 1.5 hours with stirring. After completion of the reaction, nitrogen was introduced into the reaction vessel to return the pressure to ordinary pressure, and the polycarbonate resin yielded was taken out. Thus, a polycarbonate resin H configured of BHEPF/ISB=50.0 mol %/50.0 mol % was obtained. The properties of the polycarbonate resin H obtained were determined. A transparent film was formed therefrom in the same manner as in Example 1, and the properties thereof were determined. The measured values are shown in Table 1.

Comparative Example 3

The same procedure as in Example 1 was conducted, except that use was made of 31.9 parts by weight of ISB, 71.8 parts by weight of BHEPF, 32.1 parts by weight of TCDDM, and 118.7 parts by weight of DPC. Thus, a polycarbonate resin I was obtained. The polycarbonate resin I obtained had a composition composed of BHEPF/ISB/TCDDM=30.0 mol %/40.0 mol %/30.0 mol %. The properties of the polycarbonate resin I obtained were determined. A transparent film was formed therefrom in the same manner as in Example 1, and the properties thereof were determined. The measured values are shown in Table 1.

Ltd.) was used. Water was dropped onto a substrate, and the contact angle was measured at 5 seconds after the dropping. The measurement conditions were conditions for static contact angle measurement. The water used was ultrapure water, and the droplet volume was adjusted to 0.5 μL. Each film was repeatedly subjected to the measurement 10 times, and an average value thereof was taken as the measured value.

<Birefringence (Δn2) and Retardation Characteristics of Film>

The retardation characteristics of a film were determined by measuring the three-dimensional-direction refractive indexes and retardation (590 nm, 23° C.) thereof using a Mueller matrix polarimeter (AXO Scan, manufactured by AXOMETRICS Inc.). The birefringence here is expressed by Δn2 for the purpose of distinction because the film examined here had been produced under conditions different from the conditions for the birefringence (Δn1) described above.

Example 7

The resin used in Example 1 was vacuum-dried at 80° C. for 5 hours. This polycarbonate resin was formed into a film

TABLE 1

| | | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Poly-carbonate resin | BHEPF | mol % | 47.4 | 37.7 | 33.7 | 42.9 | 37.8 | 37.0 | — | 50.0 | 30.0 |
| | ISB | mol % | 37.1 | 44.0 | 34.3 | 52.8 | 59.3 | 52.7 | 30.0 | 50.0 | 40.0 |
| | 1,4-CHDM | mol % | 15.5 | — | 32.0 | — | — | — | — | — | — |
| | TCDDM | mol % | — | — | — | — | — | — | 50.0 | — | 30.0 |
| | DEG | mol % | — | 18.3 | — | — | — | 10.3 | — | — | — |
| | PEG#400 | mol % | — | — | — | 4.3 | 2.9 | — | — | — | — |
| | BCF | mol % | — | — | — | — | — | — | 20 | — | — |
| Results of various kinds of evaluation | Reduced viscosity | dL/g | 0.395 | 0.402 | 0.445 | 0.372 | 0.363 | 0.359 | 0.315 | 0.375 | 0.381 |
| | Glass transition point | ° C. | 136.6 | 123 | 126 | 126 | 130 | 135 | 140 | 157 | 132 |
| | Refractive index | | 1.608 | 1.595 | 1.586 | 1.595 | 1.590 | 1.601 | 1.575 | 1.611 | 1.579 |
| | Film toughness | Number of folding operations | 7 | 18 | 10 | 16 | 13 | 12 | 3 | 2 | 5 |
| | Birefringence Δn1 | | 0.0011 | 0.0014 | 0.0026 | 0.0012 | 0.0017 | 0.0013 | 0.0006 | 0.0005 | 0.001 |
| | Photoelastic coefficient | $(\times 10^{-12}\,Pa^{-1})$ | 30 | 29 | 30 | 28 | 25 | 26 | 19 | 26 | 25 |
| | R450/R550 | | 0.885 | 0.861 | 0.954 | 0.88 | 0.927 | 0.92 | 0.885 | 0.523 | 0.925 |
| | Water absorption | % | 0.8 | 1.0 | 0.7 | 1.2 | 1.3 | 1.2 | 0.7 | 0.8 | 0.7 |

Besides the Examples and Comparative Examples given above, the following Examples and Comparative Examples were further conducted.

The evaluation items which were added in the following Examples and Comparative Examples were evaluated in the following manners.

<Film Thickness>

The thickness was measured using contact type thickness gauge "PEACOCK" (product name), manufactured by Ozaki MFG. Co., Ltd.

<Transmittance>

The value of Y measured with a spectrophotometer (product name "DOT-3", manufactured by Murakami Color Research Laboratory Co., Ltd.) at 23° C. and a wavelength of 550 nm as reference conditions was used.

<Contact Angle with Water>

A solid/liquid interface analyzer (product name "Drop Master 300", manufactured by Kyowa Interface Science Co., having a thickness of 90 μm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. This film was subjected to free-end uniaxial stretching using a batch-type biaxially stretching apparatus (manufactured by Toyo Seiki Seisaku-Sho, Ltd.) at a stretching temperature of 142° C. in a stretch ratio of 2.0 to obtain a retardation film having a Δnd of 140 nm, a thickness of 61 μm, and an R450/R550 of 0.851. The properties of the retardation film obtained were determined, and the results thereof are shown in Table 2. This retardation film was laminated to a polarizing plate, and this laminate was mounted on a display device. As a result, exceedingly high display quality was obtained.

Example 8

The resin used in Example 2 was formed into a film in the same manner as in Example 7. Thus, a film having a thickness of 90 μm was produced. This film was subjected to free-end uniaxial stretching with the stretching machine used in Example 7, at a stretching temperature of 129° C. in a stretch ratio of 2.0 to obtain a retardation film having a Δnd of 139 nm, a thickness of 46 μm, and an R450/R550 of 0.889. The properties of the retardation film obtained were determined, and the results thereof are shown in Table 2. This retardation film was laminated to a polarizing plate, and this laminate was mounted on a display device. As a result, exceedingly high display quality was obtained.

Example 9

The resin used in Example 3 was formed into a film in the same manner as in Example 7. Thus, a film having a thickness of 90 μm was produced. This film was subjected to free-end uniaxial stretching with the stretching machine used in Example 7, at a stretching temperature of 129° C. in a stretch ratio of 2.0 to obtain a retardation film having a Δnd of 140 nm, a thickness of 40 μm, and an R450/R550 of 0.954. The properties of the retardation film obtained were determined, and the results thereof are shown in Table 2. This retardation film was laminated to a polarizing plate, and this laminate was mounted on a display device. As a result, exceedingly high display quality was obtained.

Example 10

The resin used in Example 4 was formed into a film in the same manner as in Example 7. Thus, a film having a thickness of 70 μm was produced. This film was subjected to free-end uniaxial stretching with the stretching machine used in Example 7, at a stretching temperature of 131° C. in a stretch ratio of 2.0 to obtain a retardation film having a Δnd of 140 nm, a thickness of 46 μm, and an R450/R550 of 0.879. The properties of the retardation film obtained were determined, and the results thereof are shown in Table 2. This retardation film was laminated to a polarizing plate, and this laminate was mounted on a display device. As a result, exceedingly high display quality was obtained.

Example 11

The resin used in Example 5 was formed into a film in the same manner as in Example 7. Thus, a film having a thickness of 70 μm was produced. This film was subjected to free-end uniaxial stretching with the stretching machine used in Example 7, at a stretching temperature of 135° C. in a stretch ratio of 2.0 to obtain a retardation film having a Δnd of 139 nm, a thickness of 43 μm, and an R450/R550 of 0.914. The properties of the retardation film obtained were determined, and the results thereof are shown in Table 2. This retardation film was laminated to a polarizing plate, and this laminate was mounted on a display device. As a result, exceedingly high display quality was obtained.

Example 12

The resin used in Example 6 was formed into a film in the same manner as in Example 7. Thus, a film having a thickness of 70 μm was produced. This film was subjected to free-end uniaxial stretching with the stretching machine used in Example 7, at a stretching temperature of 140° C. in a stretch ratio of 2.0 to obtain a retardation film having a Δnd of 141 nm, a thickness of 49 μm, and an R450/R550 of 0.906. The properties of the retardation film obtained were determined, and the results thereof are shown in Table 2. This retardation film was laminated to a polarizing plate, and this laminate was mounted on a display device. As a result, exceedingly high display quality was obtained.

Example 13

The resin used in Example 6 was formed into a film in the same manner as in Example 7. Thus, a film having a thickness of 130 μm was produced. This film was laminated to a shrinkable film (biaxially stretched PP film) with a pressure-sensitive adhesive. Using the stretching machine used in Example 7, the laminate was shrunk by 20% and further subjected to fixed-end uniaxial stretching in a stretch ratio of 1.2, at a stretching temperature of 135° C. Thus, a retardation film having a Δnd of 140 nm, a thickness of 128 μm, and an R450/R550 of 0.906 was obtained. The properties of the retardation film obtained were determined, and the results thereof are shown in Table 2. This retardation film was laminated to a polarizing plate, and this laminate was mounted on a display device. As a result, exceedingly high display quality was obtained.

Example 14

The resin used in Example 6 was formed into a film in the same manner as in Example 7. Thus, a film having a thickness of 170 μm was produced. Using the stretching machine used in Example 7, this film was subjected to free-end longitudinal stretching at a stretching temperature of 126° C. in a stretch ratio of 1.3 and then to fixed-end uniaxial stretching at 140° C. in a stretch ratio of 1.5 to obtain a retardation film having a Δnd of 54 nm, a thickness of 60 μm, and an R450/R550 of 0.906. The properties of the retardation film obtained were determined, and the results thereof are shown in Table 2. This retardation film was laminated to a polarizing plate, and this laminate was mounted on a display device. As a result, exceedingly high display quality was obtained.

Comparative Example 4

The resin used in Comparative Example 3 was formed into a film and stretched in the same manner as in Example 7 to obtain a retardation film having a Δnd of 32 nm, a thickness of 62 μm, and an R450/R550 of 0.925. The properties of the retardation film obtained were determined, and the results thereof are shown in Table 2. This retardation film was combined with a polarizing plate, and this combination was combined with a display device. As a result, the device came to have display quality including extremely poor visibility.

Comparative Example 5

"WRF", manufactured by Teijin Chemicals Ltd., was used and examined for optical properties and film properties. The results thereof are shown in Table 2. This retardation film was combined with a polarizing plate, and this combination was combined with a display device. As a result, uneven light transmission (i.e., unevenness) was observed. Namely, poor display uniformity resulted.

TABLE 2

| | | | Example 7 | Example 8 | Example 9 | Example 10 | Example 11 | Example 12 |
|---|---|---|---|---|---|---|---|---|
| Polycarbonate resin | BHEPF | mol % | 47.4 | 37.7 | 33.7 | 42.9 | 37.8 | 37.0 |
| | ISB | mol % | 37.1 | 44.0 | 34.3 | 52.8 | 59.3 | 52.7 |
| | 1,4-CHDM | mol % | 15.5 | — | 32.0 | — | — | — |
| | TCDDM | mol % | — | — | — | — | — | — |
| | DEG | mol % | — | 18.3 | — | — | — | 10.3 |
| | PEG#400 | mol % | — | — | — | 4.3 | 2.9 | — |
| | BCF | mol % | — | — | — | — | — | — |
| Results of various kinds of evaluation | Reduced viscosity | dL/g | 0.395 | 0.402 | 0.445 | 0.372 | 0.363 | 0.359 |
| | Glass transition point | °C. | 136.6 | 123 | 126 | 130 | 126 | 135 |
| | Film toughness | Number of folding operations | 7 | 18 | 10 | 16 | 13 | 12 |
| | Birefringence $\Delta n2$ | | 0.0023 | 0.003 | 0.0035 | 0.0026 | 0.0032 | 0.0029 |
| | Photoelastic coefficient | $(\times 10^{-12} \text{ Pa}^{-1})$ | 30 | 29 | 30 | 28 | 25 | 26 |
| | R450/R550 | | 0.851 | 0.889 | 0.954 | 0.879 | 0.914 | 0.906 |
| | Stretching method | Uniaxial stretching | free-end | free-end | free-end | free-end | free-end | free-end |
| | Water absorption | % | 0.8 | 1.0 | 0.7 | 1.2 | 1.3 | 1.2 |
| | Retardation value | nm | 140 | 139 | 140 | 140 | 139 | 141 |
| | NZ coefficient | | 1.0 | 1.0 | 1.0 | 1.0 | 1.0 | 1.0 |
| | nx, ny, nz | | nx > ny = nz | nx > ny = nz | nx > ny = nz | nx > ny = nz | nx > ny = nz | nx > ny = nz |
| | Transmittance | % | 93 | 92 | 92 | 92 | 92 | 92 |
| | Thickness | μm | 61 | 46 | 40 | 54 | 43 | 49 |
| | Evaluation of mounting | | good | good | good | good | good | good |

| | | | Example 13 | Example 14 | Comparative Example 4 | Comparative Example 5 |
|---|---|---|---|---|---|---|
| Polycarbonate resin | BHEPF | mol % | 37.0 | 37.0 | 30.0 | — |
| | ISB | mol % | 52.7 | 52.7 | 40.0 | — |
| | 1,4-CHDM | mol % | — | — | — | — |
| | TCDDM | mol % | — | — | 30.0 | — |
| | DEG | mol % | 10.3 | 10.3 | — | — |
| | PEG#400 | mol % | — | — | — | — |
| | BCF | mol % | — | — | — | — |
| Results of various kinds of evaluation | Reduced viscosity | dL/g | 0.359 | 0.359 | 0.381 | — |
| | Glass transition point | °C. | 135 | 135 | 132 | — |
| | Film toughness | Number of folding operations | 12 | 12 | 5 | — |
| | Birefringence $\Delta n2$ | | 0.0029 | 0.0029 | 0.0023 | |
| | Photoelastic coefficient | $(\times 10^{-12} \text{ Pa}^{-1})$ | 26 | 26 | 25 | 60 |
| | R450/R550 | | 0.906 | 0.906 | 0.925 | 0.891 |
| | Stretching method | Uniaxial stretching | shrinkage + fixed-end | free-end + fixed-end | fixed-end | free-end |
| | Water absorption | % | 1.2 | 1.2 | 0.7 | 0.2 |
| | Retardation value | nm | 140 | 54 | 32 | 140 |
| | NZ coefficient | | 0.5 | 2.9 | 1.5 | 1.0 |
| | nx, ny, nz | | nx > ny > nz | nx > nz > ny | nx > ny = nz | nx > ny = nz |
| | Transmittance | % | 92 | 92 | 92 | 91 |
| | Thickness | μm | 128 | 60 | 62 | 50 |
| | Evaluation of mounting | | good | good | poor | poor |

It is apparent from the results given in Table 1 and Table 2 that the polycarbonate resins which contain a specific amount of a first structural unit derived from a dihydroxy compound represented by the general formula (1) and a specific amount of a second structural unit derived from at least one compound selected from the group consisting of a dihydroxy compound represented by the general formula (2), an alicyclic dihydroxy compound, and an oxyalkylene glycol and which have a glass transition temperature of 110-150° C. and the transparent films formed from these polycarbonate resins have excellent toughness, a low photoelastic coefficient, excellent orientation properties, and high birefringence.

It can be seen from the results given in Table 2 that the retardation films obtained by uniaxially stretching films formed from the polycarbonate resins are excellent in terms of the control of thickness, transparency, and retardation and accommodate polarizing plates suitable for appliances required to be precise, thin, and homogeneous.

This application is based on a Japanese patent application filed on Nov. 17, 2009 (Application No. 2009-262011), a Japanese patent application filed on May 27, 2010 (Application No. 2010-121984), and a Japanese patent application filed on Jun. 30, 2010 (Application No. 2010-149798), the contents thereof being incorporated herein by reference.

The invention claimed is:

1. A transparent film having a birefringence of more than 0.001, comprising:
a polycarbonate resin which comprises:
a first structural unit derived from a dihydroxy compound represented by a general formula (1);
a second structural unit derived from a dihydroxy compound represented by a general formula (2); and
a third structural unit derived from at least one, a dihydroxy compound represented by general formula (5)
wherein the dihydroxy compound represented by the general formula (1) is 9,9-[4-(2-hydroxyethoxy)phenyl]fluorene,
wherein the first structural unit accounts for 18% by mole or more of the polycarbonate resin, and
wherein the polycarbonate resin has a reduced viscosity of 0.30 dL/g or higher

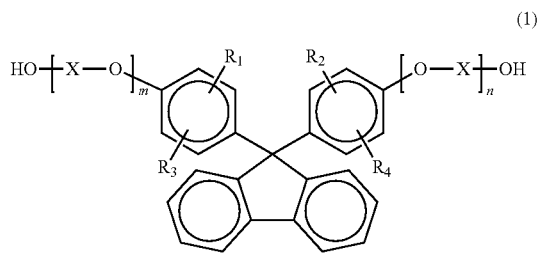

(1)

wherein the general formula (1), $R_1$ to $R_4$ each independently represent a hydrogen atom, a substituted or unsubstituted alkyl group having 1-20 carbon atoms, a substituted or unsubstituted cycloalkyl group having 6-20 carbon atoms, or a substituted or unsubstituted aryl group having 6-20 carbon atoms, X represents a substituted or unsubstituted alkylene group having 2-10 carbon atoms, a substituted or unsubstituted cycloalkylene group having 6-20 carbon atoms, or a substituted or unsubstituted arylene group having 6-20 carbon atoms, and m and n each independently are an integer of 0-5;

(2)

wherein the general formula (3), $R_5$ represents a substituted or unsubstituted, monocyclic cycloalkylene group having 4-20 carbon atoms;
wherein the general formula (4), $R_6$ represents a substituted or unsubstituted, monocyclic cycloalkylene group having 4-20 carbon atoms;
wherein the general formula (5), $R_7$ represents a substituted or unsubstituted alkylene group having 2-10 carbon atoms, and p is an integer of 2 to 15;
wherein the general formula (6), $R_{11}$ represents either an alkyl group having 2-20 carbon atoms or the group represented by a formula (7).

2. The transparent film according to claim 1, wherein the transparent film has been stretched at least in one direction.

3. The transparent film according to claim 1, wherein the transparent film has a refractive index as measured with sodium D-line (589 nm) in the range of 1.57 to 1.62.

4. The transparent film according to claim 1, wherein the transparent film satisfies expression (5), $$0.5 \leq R450/R550 \leq 1.0 \quad (5)$$

wherein the equation (5), R450 represents a retardation measured at a wavelength of 450 nm and R550 represents a retardation measured at a wavelength of 550 nm.

5. The transparent film according to claim 1, wherein the transparent film has a thickness of 80 μm or less.

6. The transparent film according to claim 1, wherein the transparent film satisfies one of expressions (6) to (8);

$$nx > ny = nz \quad (6)$$

$$nx > ny > nz \quad (7)$$

$$nx > nz > ny \quad (8)$$

wherein nx and ny represent refractive indexes in two in-plane directions, nz represents a refractive index in a thickness-direction of the transparent film.

7. The transparent film according to claim 1, wherein the transparent film satisfies expressions (9) and (10);

$$NZ=(nx-nz)/(nx-ny)=0.2 \text{ to } 8 \quad (9)$$

$$\Delta nd=(nx-ny)\cdot d=30 \text{ to } 400 \text{ nm} \quad (10)$$

wherein nx and ny represent refractive indexes in two in-plane directions, nz represents a refractive index in a thickness-direction, and d represents a thickness of the transparent film.

8. The transparent film according to claim 1, wherein the transparent film has a water absorption higher than 1.0% by weight.

9. The transparent film according to claim 1, wherein the transparent film has a photoelastic coefficient of $40 \times 10^{-12}$ $Pa^{-1}$ or less.

10. A polarizing plate comprising the transparent film according to claim 1 and a polarizer thereon.

* * * * *